Figure 1:
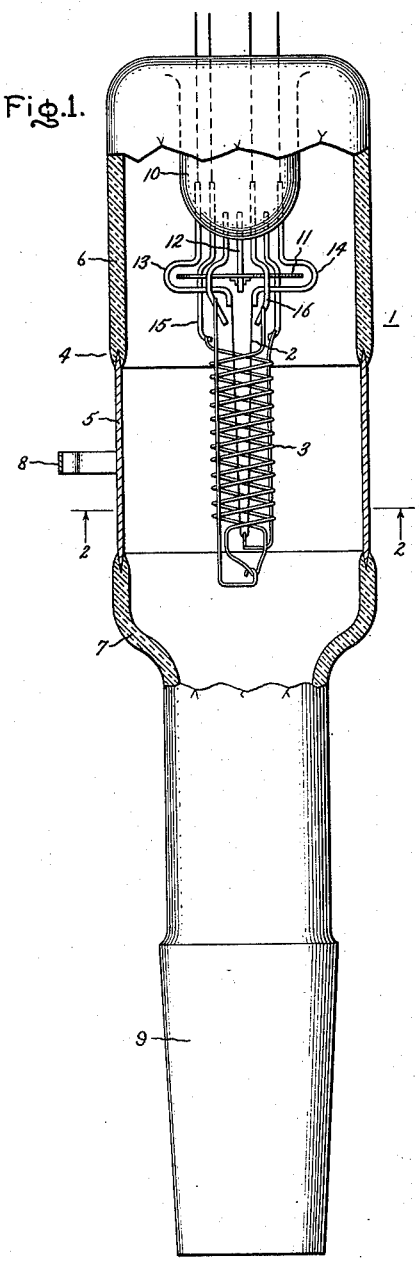

Sept. 26, 1950      W. I. RELYEA      2,523,779

IONIZATION GAUGE

Filed March 10, 1949

Inventor:
Walter I. Relyea,
by Merton D. Moore
His Attorney.

Patented Sept. 26, 1950

2,523,779

UNITED STATES PATENT OFFICE 2,523,779

IONIZATION GAUGE

Walter I. Relyea, Burnt Hills, N. Y., assignor to General Electric Company, a corporation of New York Application March 10, 1949, Serial No. 80,697

1 Claim. (Cl. 250—27.5)

My invention relates to an improved discharge apparatus for determining gaseous pressure as a function of the ionization produced in the gas.

A common method of measuring the degree of vacuum in an evacuated system has been to ionize the molecules of gas in such a system by electrons from a cathode and to measure the current flow produced by the ionized molecules. For a given electron current, it has been found that the gas pressure in the system being measured varies directly with the ion current over a useful operating range.

In such discharge apparatus for measuring vacuum as indicated by the ionization current, it has been common to enclose within an envelope communicating with the vacuum system a cathode, a wire-wound or otherwise perforated anode, and a tubular collector electrode surrounding the anode and cathode and concentric with them. In this type of device the collector is maintained at a negative potential to attract the positive ions produced by the electrons in their passage to the anode, the ions passing through the open spaces in the anode to the collector. A large collecting surface has been found desirable which could collect all of the ions produced so that the current accurately reflects the quantity of gas molecules present.

In operation, however, certain difficulties have been encountered, chiefly the problem of degassing the metallic electrodes of the device. Since degassing requires heating of the elements to a high temperature to drive out all the occluded gas molecules, the size of the collecting electrode has been limited in order that it could be effectively degassed by heat from the grid and cathode. At the same time the collector must be sufficiently spaced from the other electrodes to permit dissipation of the heat generated by the ions striking the collector and to prevent electrical leakage along the stem surface between the electrode leads. In some constructions an attempt to overcome degassing difficulty has resulted in the application of a metallic collecting film to the internal surface of the ionization gage envelope instead of using a stem-supported collector. But while such a surface could be degassed by heating the envelope directly, other difficulties are presented in connecting the collecting surface to the measuring circuit.

It is an object of my invention to provide an improved ionization gage which may be simply and effectively degassed.

A feature of my invention, is the use, in the type of apparatus described, of an envelope having a tubular metallic section which comprises the collector electrode for the ionization gage. A terminal for connecting the collector electrode to the measuring circuit is provided on the exterior surface of the collector and furnishes a convenient connection which is adequately spaced from the electrode leads in the stem. To the ends of the collector electrode are sealed glass envelope sections, one of which is adapted to be connected to the vacuum system to be measured and the other containing a stem through which the cathode and anode leads are sealed. This collector electrode may be simply and quickly degassed by applying a flame to its external surface.

Another feature of my invention is the provision for minimizing electrical leakage between the collector electrode and other elements so as to preserve the accuracy of the gage. A stem shield supported from the stem end of the envelope and opposite the end of the envelope communicating with the vacuum system is used to shield the stem surface in the vicinity of the cathode and anode leads from stray cathode emission and contaminating particles. In this manner leakage along the surface of the stem is minimized, and in view of the long distance from the stem to the collector electrode, the collector electrode is completely insulated.

Electrical leakage is also decreased because the efficient heat dissipation from the external collector surface maintains the stem and other vitreous portions of the envelope at a relatively low temperature and thus preserves the maximum surface resistance.

For additional objects and advantages, and for a better understanding of the invention, attention is now directed to the following description and accompanying drawing, and also to the appended claim in which the features of the invention believed to be novel are particularly pointed out.

Figure 2:
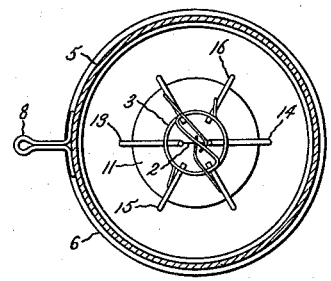
Figure 3:
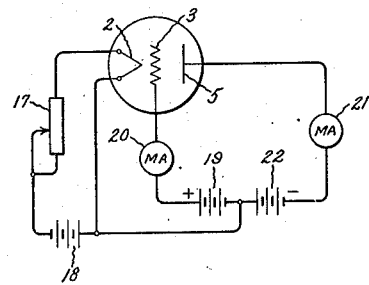

Fig. 1 shows an ionization gage embodying my invention. Fig. 2 is a view along the line 2—2 of Fig. 1 and Fig. 3 illustrates a circuit in which my ionization gage may be used.

Referring now to Fig. 1, there is shown a discharge device 1 having a cathode 2 and a foraminated anode electrode 3 within an envelope 4. A filamentary type cathode of thoriated tungsten is employed, but an equivalent electron emitter may be used. To permit the ions formed by collision of the emitted electrons with the gas molecules to travel past the anode, a wire-wound anode having relatively large spaces between the wire members is shown in this embodiment. Part of the envelope is a tubular metallic collector electrode 5 which is located symmetrically about the filament and anode electrodes and disposed opposite the active portions of those electrodes. The ends of the collector electrode are suitably tapered and sealed to the vitreous envelope sections 6 and 7. The collector electrode and the vitreous envelope sections should have matching expansion characteristics, and with this in mind, I have found a satisfactory combination in the use of an iron-nickel-cobalt alloy for the collector and borosilicate glass for the vitreous envelope sections. Of course, other suitable combinations may be used. An electrical terminal 8 is fastened to the external surface of the collector 5, preferably with silver solder.

To connect the device to a vacuum system, I have shown section 7 of the envelope terminating in a tapered open tube 9 having a ground glass surface. This type of connection is well known and it is obvious that other types of glass joints may be substituted so long as a gas-tight connection is provided.

Conducting leads from the cathode and anode are brought out through a re-entrant stem 10 in the upper vitreous section 6 of the envelope. To shield the stem from deposition of contaminating material which would cause electrical leakage along the stem surface, I employ a shielding disk 11 of larger area than that of the re-entrant stem 10, and mount the disk by a support member 12 from the stem. This disk serves to shield all of the stem surface from contaminating particles from the cathode 2 and from the open end 9 of the envelope. As further shown in Fig. 2 the cathode leads 13 and 14 and the anode leads 15 and 16 are bent to space them from the edge of the shield 11.

In operation the ionization gage is first connected to a vacuum system to be measured through the open end 9 of the envelope. As indicated in Fig. 3, the filament 2 is heated by connecting it in series with a current adjusting rheostat 17 to a suitable current source 18. The foraminous anode 3 is connected to the positive terminal of a direct current source 19, the negative terminal of which is connected to the filament circuit. In series with the anode is a milliammeter 20 to measure the electron current. The collector electrode 5 is connected through a microammeter 21 or a similar instrument to the negative terminal of a direct current source 22, the other side of which is connected to the filament circuit.

In a particular ionization gage constructed according to my invention, I may apply, for example, a positive anode voltage of 150 volts. Then the filament current is adjusted by means of rheostat 17 to maintain the anode current, as indicated by the anode milliammeter 20, at 5 milliamperes. The emitted electrons strike the gas molecules present in the envelope of the gage, creating positive ions which are attracted through the apertures of the foraminous anode 3 to the collector 5. Using a collector potential of —25 volts and a microammeter having a zero to 100 microammeter response, I may measure accurately the pressure as a direct function of the ion current. Other values of electrode voltages may, of course, be used, depending upon the desired range of operation.

To measure vacuum at very low pressures accurately, the ion gage elements must be degassed. The collector is very simply degassed by applying a flame to its external surface in the same manner as the glass envelope is customarily heated. The other electrodes may be degassed in the usual manner by temporarily connecting their respective terminals to a current source to raise their temperature.

The heat resulting from bombardment of the collector by the positive ions is readily dissipated from the external collector surface to the atmosphere, thus permitting the gage to be operated at a relatively low temperature. Cooling fins or other means may be easily applied to the collector surface for faster cooling if desired. Hence, in view of my particular collector structure, difficulties encountered by the release of any remaining occluded gases during operation of the gage are largely avoided. Similarly, electrical leakage along the surface of the vitreous portion of the envelope is minimized as the entire device operates at a relatively low temperature and thus maintains a high surface resistance on the vitreous portions of the envelope.

While certain specific embodiments have been shown and described, it will, of course, be understood that various modifications may be made without departing from the invention. The appended claim is, therefore, intended to cover any such modifications within the true spirit and scope of the invention.

What I claim as new and desire to secure by Letters Patent of the United States is:

An ionization gage comprising an elongated thermionic cathode, a wire-wound anode surrounding said cathode, a cylindrical metallic ion collector surrounding said anode and concentric therewith, a first glass tubular member having a closed end and sealed at its open end to one end of said collector, conductive support members for said cathode and said anode sealed into said closed end of said glass member, said members providing external terminals for said cathode and said anode, and a second glass tubular member having one end sealed to the other end of said collector, the other end of said second glass member being open to comprise a vacuum system junction, said glass members and said collector having substantially similar thermal expansion characteristics in order that said gage may be safely heated to degassing temperatures.

WALTER I. RELYEA.

REFERENCES CITED

The following references are of record in the file of this patent:

UNITED STATES PATENTS

| Number | Name | Date |
|---|---|---|
| 1,765,605 | Mouromtseff | June 24, 1930 |
| 2,173,679 | Clark et al. | Sept. 19, 1939 |
| 2,212,849 | Slack et al. | Aug. 27, 1940 |
| 2,375,280 | Cablick | May 8, 1945 |